United States Patent [19]

Artweger et al.

[11] 4,277,919
[45] Jul. 14, 1981

[54] CABIN CONSTRUCTION

[75] Inventors: Wolfgang Artweger; Anton Burger, both of Windischgarsten, Austria

[73] Assignee: "Wohn-Art"-Freizeitartikel Gesellschaft m.b.H., Windischgarsten, Austria

[21] Appl. No.: 86,686

[22] Filed: Oct. 19, 1979

[30] Foreign Application Priority Data

Nov. 6, 1978 [AT] Austria .................... 7925/78

[51] Int. Cl.³ .................... E04B 1/343; E04B 1/345
[52] U.S. Cl. .................... 52/2; 52/67; 52/121
[58] Field of Search .................... 52/2, 67, 121; 49/477

[56] References Cited

U.S. PATENT DOCUMENTS

| 3,341,986 | 9/1967 | Brosig | 52/67 |
| 3,837,700 | 9/1974 | Van Slyke | 49/477 |
| 4,103,462 | 8/1978 | Freller | 52/67 |

Primary Examiner—Alfred C. Perham
Attorney, Agent, or Firm—Kurt Kelman

[57] ABSTRACT

A cabin construction comprises a main cabin and an extension cabin telescopingly received in an open end of the main cabin. A first guide arrangement glidably carries and guides the extension cabin for telescoping movement in relation to the main cabin and includes a cable line having two portions respectively extending in vertical planes parallel to the cabin side walls and a pair of superposed pulleys mounted near each side wall of the extension cabin near an open end thereof, each cable line portion being trained over a respective pair of pulleys in zigzag arrangement. A second guide arrangement guides the extension cabin parallel to the main cabin and includes a cable line having two portions extending horizontally parallel to the floor and roof, and two pairs of pulleys mounted on one wall of the extension cabin, the pulleys of each pair being arranged symmetrically with respect to the longitudinal axis and each cable line portion being trained over a respective pair of the pulleys in zigzag arrangement. A gasket is arranged in the space between the cabin walls and is operable to engage the walls for sealing the space.

33 Claims, 8 Drawing Figures

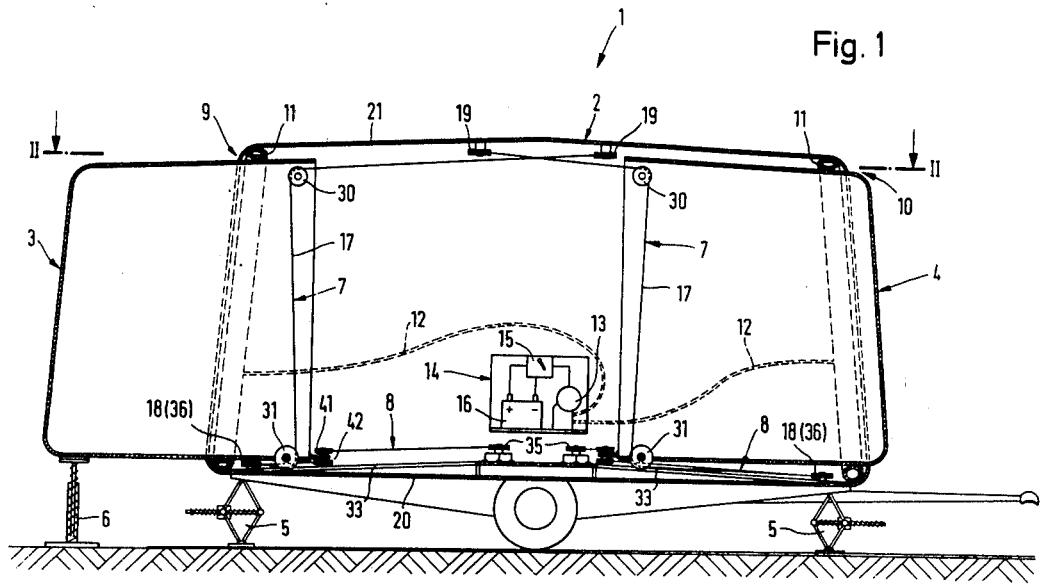
Fig. 1
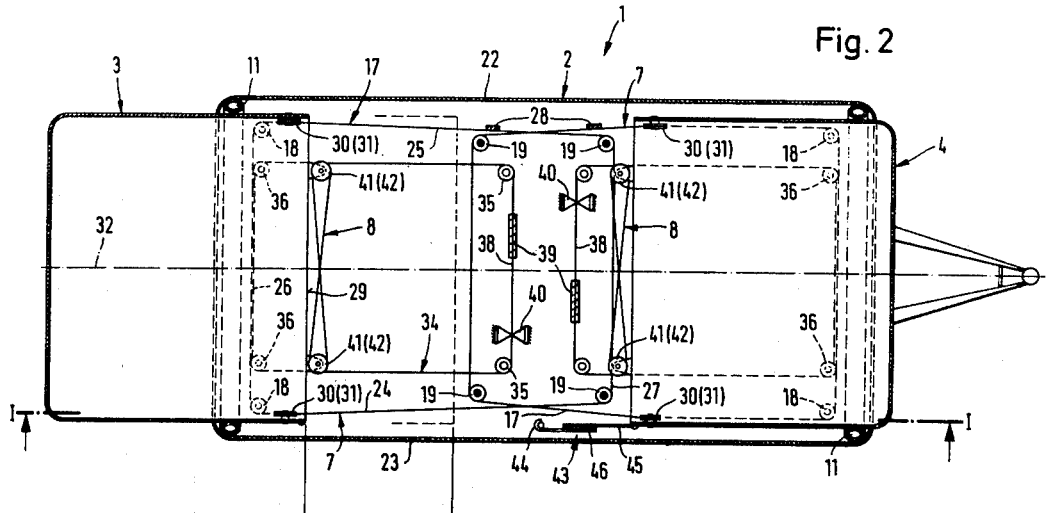
Fig. 2
Fig. 7
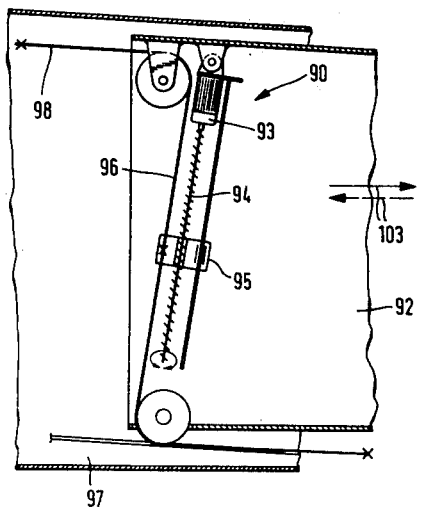
Fig. 8
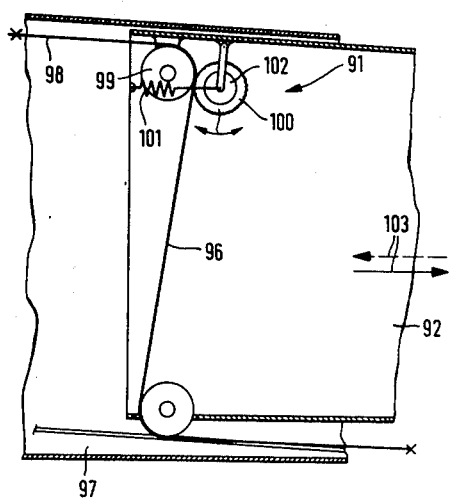

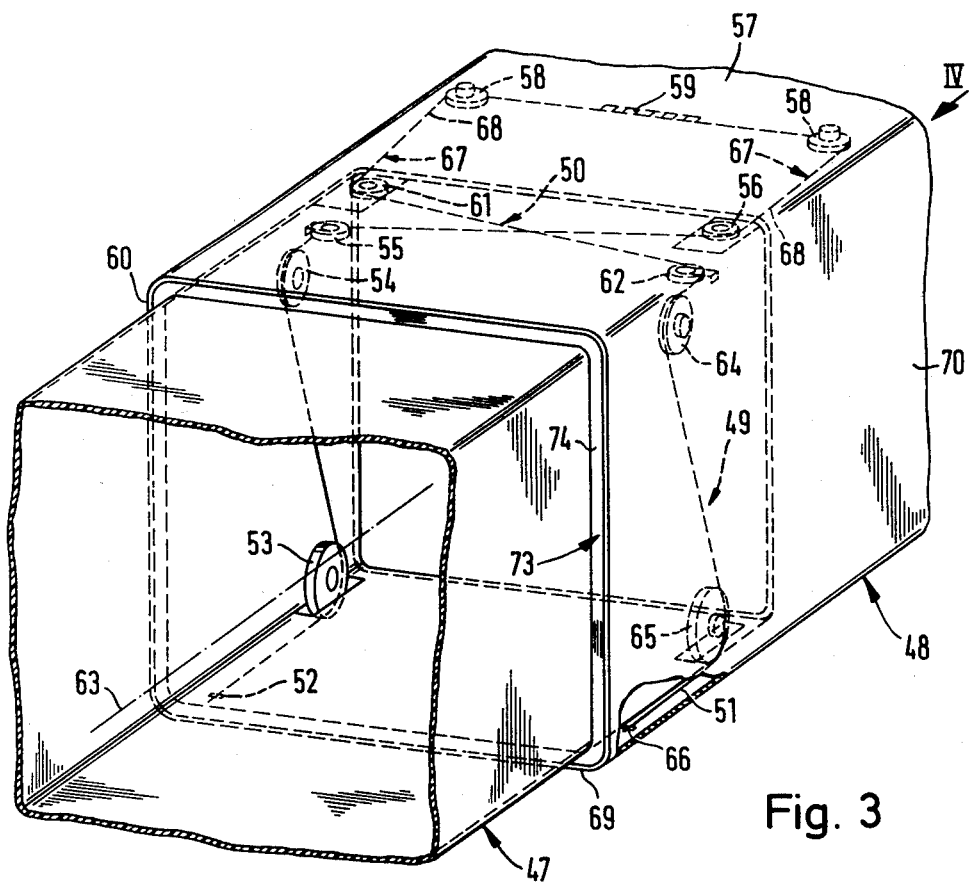
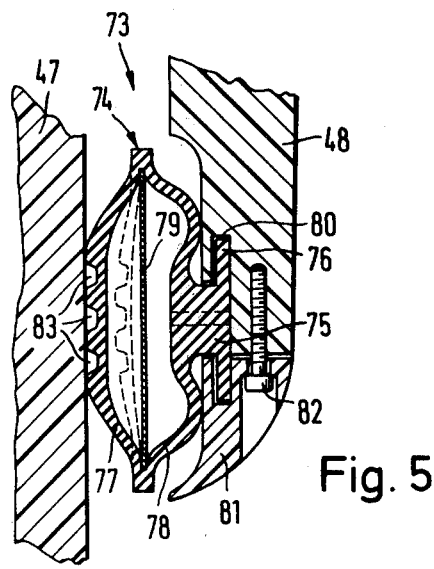
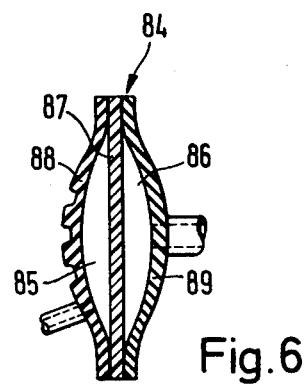
Fig. 3
Fig. 5
Fig. 6

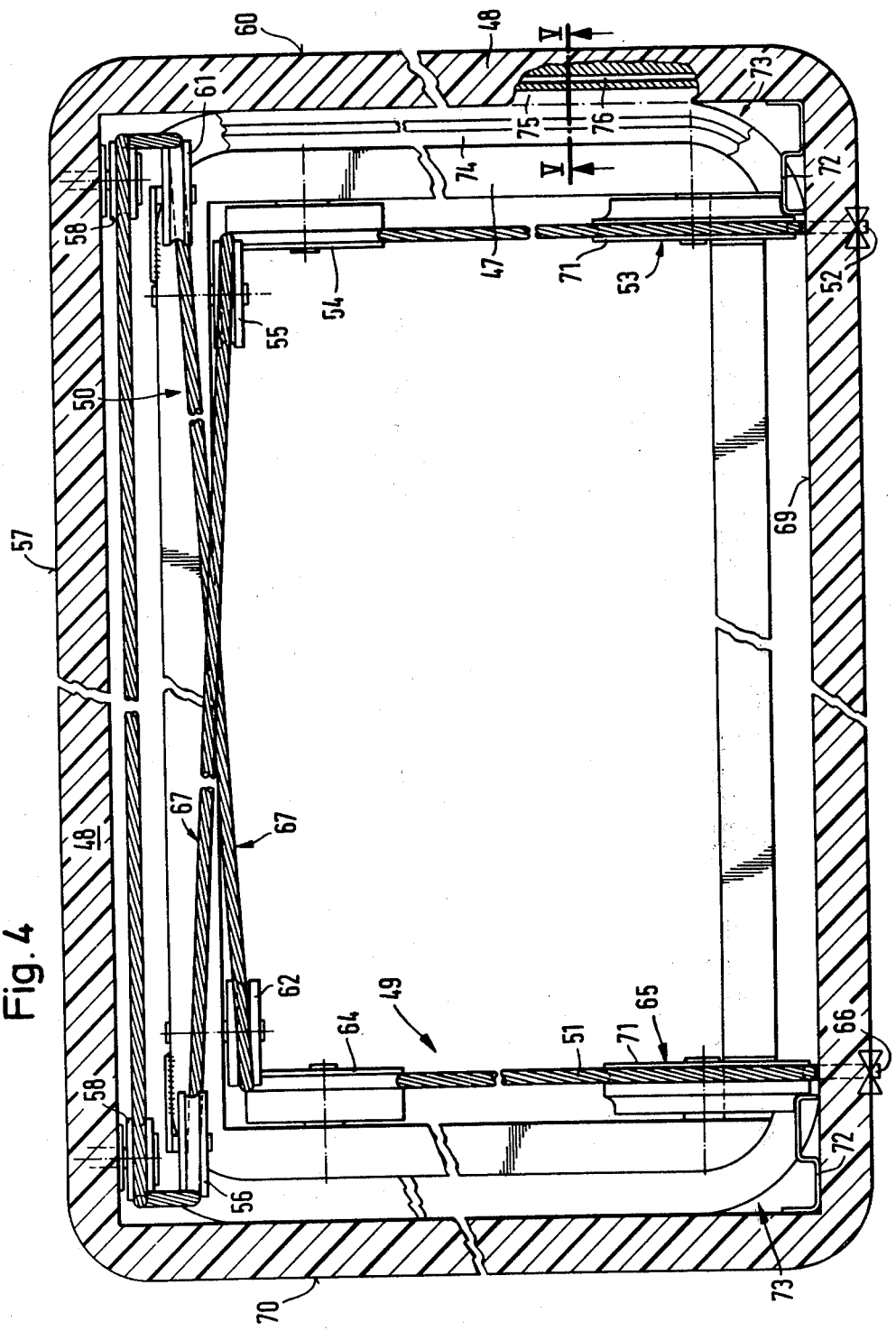

CABIN CONSTRUCTION

The present invention relates to a cabin construction defining an interior chamber of changeable size and comprising a main cabin and an extension cabin, to a guide arrangement for the telescoping movement of the extension cabin and to a gasket means for sealing the space between the walls of the cabins.

U.S. Pat. No. 4,103,462, dated Aug. 1, 1978, discloses a cabin construction comprising a main cabin having two side walls and an upper and a lower wall interconnecting the side walls, one end of the main cabin being open and the main cabin having a longitudinal axis extending centrally between the side walls, an extension cabin having two sides walls and an upper and a lower wall interconnecting the side walls, one end of the extension cabin being open and the open end of the extension cabin being telescopingly received in the open end of the main cabin, and a guide means for glidably carrying and guiding the extension cabin for telescoping movement in relation to the main cabin in the direction of the longitudinal axis. The guide means includes two flexible tensile elements respectively extending in vertical planes substantially parallel to the side walls and a pair of superposed pulleys mounted in the vicinity of each side wall of the extension cabin near the open end thereof, each flexible tensile element being trained over a respective pair of the pulleys in zigzag arrangement. The two flexible tensile elements are portions of an endless cable line. The endless cable line is trained over two support pulleys mounted on the roof of the main cabin in the vicinity of the main cabin end opposite the open end thereof while the lower ones of the superposed pulleys are mounted on the floor of the main cabin, the cable line being led from the support pulleys on the roof over the upper pulleys of the superposed pulleys and then over the lower pulleys along the side walls. This guide system assures a constant vertical support for the extension cabin even when it is fully extended and requires only a minor overlap between the main and extension cabin in the extended position. The disclosure of this patent is incorporated herein by way of reference.

While the guide system disclosed in the patent has been quite successful, experience has shown that it does not always provide a fully effective guidance for the extension cabin.

It is the primary object of this invention to improve a cabin construction of the above-described type in a manner effectively assuring full support and accurate guidance of the telescoping movement of the extension cabin in relation to the main cabin in every position.

The above and other objects are accomplished according to one aspect of the invention by providing a second guide means for guiding the extension cabin parallel to the longitudinal axis. The second guide means includes two flexible guide elements extending horizontally substantially parallel to the upper and lower walls, and two pairs of pulleys mounted on one of the walls of the extension cabin preferably near the open end thereof, the pulleys of each pair being arranged symmetrically with respect to the longitudinally axis, each flexible guide element being trained over a respective pair of the pulleys in zigzag arrangement and the two guide elements being mirror-symmetrical with respect to the longitudinal axis. According to a preferred feature, a gasket means is arranged in a space defined by the respective side, upper and lower walls of the main and extension cabins for sealing the space.

The guide arrangement of the present invention comprises a first guide means for glidably carrying and guiding the extension cabin for the telescoping movement, which includes a cable line having two portions respectively extending in vertical planes substantially parallel to the side walls and a pair of superposed pulleys mounted in the vicinity of each side wall of the extension cabin near the open end thereof, each cable line portion being trained over a respective pair of the pulleys in zigzag arrangement, and a second guide for guiding the extension cabin parallel to the main cabin, which includes a cable line having two portions extending horizontally substantially parallel to the upper and lower walls, and two pairs of pulleys mounted on one of the walls of the extension cabin, the pulleys of each pair being arrangement symmetrically with respect to the longitudinal axis and each cable line portion being trained over a respective pair of the pulleys in zigzag arrangement, the two cable line portions being mirror-symmetrical with respect to the longitudinal axis.

According to another aspect of this invention, there is provided a perfectly counter-balanced cabin construction defining an interior chamber of changeable size and comprising a main cabin and two like extension cabins, each cabin having two side walls and an upper and a lower wall interconnecting the side walls. The main cabin has opposite open ends and a longitudinal axis centrally between the side walls, and one end of each extension cabin is open. The open end of each extension cabin is telescopingly received in a respective one of the open ends of the main cabin. A guide means for glidably carrying and guiding each extension cabin for telescoping movement in relation to the main cabin in the direction of the longitudinal axis includes a cable line including two elements respectively extending in vertical planes substantially parallel to the side walls and a transversely, extending, horizontal portion interconnecting the two elements, two anchoring pulleys mounted in the region of the upper wall of the main cabin over which the transversely extending, horizontal cable line portion is trained, and a pair of superposed pulleys mounted in the vicinity of each side wall of a respective extension cabin near the open end thereof. Each cable line element consists of another horizontal cable line portion extending from each anchoring pulley to a respective upper one of the superposed pulleys, a third cable line portion extending vertically between the respective pairs of superposed pulleys and being trained thereover, and a fourth cable line portion extending horizontally from a respective lower one of the superposed pulleys, the other cable line portion, the third cable line portion and the fourth cable line portion of each element forming a zigzag arrangement. The two anchoring pulleys for the transversely extending, horizontal cable line portion of the guide means of one extension cabin are mounted between the two anchoring pulleys for the transversely extending, horizontal cable line portion and the lower pulleys for the cable line of the guide means of the other extension cabin, in the direction of the longitudinal axis, the other cable line portions of the guide means of the extension cabins intersecting between the anchoring pulleys and the upper pulleys.

In accordance with yet another aspect of the invention, the gasket means arranged in the space defined between the walls of the main and extension cabins and operable to engage the walls for sealing the space comprises a pre-stressed sealing element encompassing the extension cabin and having a cross section extending between, and into engaging contact with, the walls of the main and extension cabins for supporting and fixing the extension cabin in position relative to the main cabin, the sealing element including a longitudinally extending support member incorporated into the sealing element and two pre-stressed elastic rubber sheets extending longitudinally on opposite sides of the support member and having their lateral edges vulcanized to the lateral edges of the support member, one of the rubber sheets having portions extending into engaging contact with the walls of the main cabin and the other rubber sheet having portions extending into engaging contact with the walls of the extension cabin, and the one rubber sheet including a web projecting therefrom and a strip carried by the web, the strip being received in a conforming groove in the walls of the main cabin for mounting the sealing element on the main cabin, each rubber sheet defining an inflatable chamber with the support member.

The guidance system of the present invention in an unexpectedly simple manner assures a properly centered support and guidance of the extension cabin during its telescoping movement, avoiding jamming of the extension cabin, and the gasket means effectively seals the space between the walls of the main and extension cabins in the retracted and the extended position of the extension cabin. The weight of the guiding and gasket means is minimal and they may be standardized for different cabin constructions while being highly dependable in operation. Since the guidance system assures an accurately centered movement of the extension cabin in relation to the main cabin, it is possible to mount a gasket at the open end of the main cabin for effective operation in all positions of the extension cabin because the tolerances between the cabin walls are quite small. This avoids any damage to the gasket during movement of the extension cabin.

The above and other objects, advantages and features of this invention will become more apparent from the following detailed description of certain now preferred embodiments thereof, taken in conjunction with the accompanying schematic drawing wherein FIG. 1 is a side elevational view of one embodiment of a cabin construction according to the invention, showing the guide and a gasket means, one of the extension cabins being in the retracted position while the other extension cabin is in the extended position, the construction being viewed along line I—I of FIG. 2;

FIG. 2 is a top view of FIG. 1, viewed along line II—II of FIG. 1;

FIG. 3 is a fragmentary perspective view illustrating another embodiment of the guide means;

FIG. 4 is a transverse section of FIG. 3, on an enlarged scale;

FIG. 5 is a fragmentary section along line V—V of FIG. 4, showing one embodiment of a gasket means;

FIG. 6 is a similar view of another embodiment of the gasket means;

FIG. 7 is a fragmentary side view illustrating one embodiment of a fixing means for the extension cabin; and FIG. 8 is a like view showing another embodiment of the fixing means.

Referring now to the drawing and first to FIGS. 1 and 2, there is shown a cabin construction defining an interior chamber of changeable size. Cabin construction 1 is illustrated as a trailer, which may serve as a mobile home, for example, and is carried for mobility on a road on a single-axle undercarriage. The trailer may have any suitable coupling means enabling it to be connected to a tractor, such as a passenger car, for movement from site to site.

Cabin construction 1 comprises main cabin 2 and two extension cabins 3, 4, extension cabin 3 being illustrated in the extended position while extension cabin 4 is shown in the retracted position. Main cabin 2 has two side walls 22, 23 and upper wall or roof 21 and lower wall or floor 20 interconnecting side walls 22, 23 the main cabin having opposite open ends 9, 10 and longitudinal axis 32 extending centrally between the side walls. Each extension cabin also has two side walls and an upper and a lower wall interconnecting the side walls, one end 29 of each extension cabin being open and the open end of each extension cabin being telescopingly received in respective open end 9, 10 of main cabin 2. The respective side, supper and lower walls of the main and extension cabins define a space therebetween. As shown in FIG. 1, suitable supports are provided for the respective ends of main cabin 2 and for the outer end of the extension cabin when it is in the extended position. Supports 5 are illustrated as collapsible parallelogram mechanism operable by a threaded spindle for erection while support 6 is a screw or hydraulic jack.

The interior chamber of cabin construction 1 is changeable in size by telescoping movement of a respective extension cabin 3, 4 in relation to main cabin 2, for which purpose the present invention combines first guide means 7 for glidably carrying and guiding each extension cabin for movement in the direction of longitudinal axis 32 with second guide means 8 for guiding each extension cabin parallel to the longitudinal axis. Gasket means 11 is aranged in the region of open ends 9, 10 of main cabin 1 in the space between the walls of the cabins and is operable to engage the walls for sealing the space. In the embodiment of the gasket means shown in FIGS. 1 and 2, the gasket means is constituted by an endless elastic tube and a compressed air inlet conduit 12 connects the tube to the output of an air compressor 13 for inflating the tube for sealing engagement with the cabin walls. Storage room 14 in main cabin 2 is accessible from the outside and houses air compressor 13 as well as operating battery 16 and a control panel 15, the battery powering the compressor whose operation is controlled from panel 15.

First guide means 7 is like the guide means described in U.S. Pat. No. 4,103,462 and includes two flexible tensile elements 24, 25 respectively extending in vertical planes substantially parallel to side walls 22, 23 and a pair of superposed pulleys 30, 31 mounted in the vicinity of each side wall of the extension cabin near the open end thereof, each flexible element 24, 25 being trained over a respective pair of pulleys 30, 31 in zigzag arrangement. In this embodiment, the two flexible elements are constituted by endless cable line 17 glidably carrying and guiding extension cabin 3, 4 for the telescoping movement. The cable line has the two portions 24, 25 respectively extending in vertical planes and trained over superposed pulleys 30, 31 in zigzag arrangement, and two horizontal end portions 26, 27 extending transversely between cable line portions 24, 25. The illustrated means for anchoring end portions 27 to main cabin 2 are two transversely aligned anchoring pulleys 19, 19 mounted on upper wall 21 of the main cabin while lower cable line portions 26 are anchored to lower wall 20 of the main cabin by two transversely aligned pulleys 18, 18. As shown, each cable line element 24, 25 consists of a horizontal cable line portion extending from each anchoring pulley 19 to a respective upper pulley 30, another portion extending vertically between respective pairs of superposed pulleys 30, 31 and being trained thereover, and a third cable line portion extending horizontally from respective lower pulley 31 to pulley 18, these portions of each element 24, 25 forming a zigzag arrangement.

The two anchoring pulleys 19, 19 for transversely extending, horizontal cable line portion 27 of guide means 7 of one extension guide cabin is mounted between the two anchoring pulleys 19, 19 for transversely extending, horizontal cable line portion 27 and lower pulleys 31, 31 for cable line 17 of the guide means, in the direction of longitudinal axis 32, the horizontal cable line portions extending from each anchoring pulley 19 to respective upper pulley 30 intersecting between the anchoring pulleys and the upper pulleys. In this manner, the forces are completely counter-balanced.

As shown in FIG. 2, tensioning device 28, which may be a turnbuckle or the like, is mounted in the horizontal cable line portions extending between pulleys 19 and 30 but it may be arranged in any portion of the cable line. The cable line is preferably comprised of a stretched steel rope having a steel core.

Guide pulleys 31 are flanged rollers running on a pair of guide rails 33 mounted on floor 20 of main cabin 2. Cable line 17 and guide rails 33 cooperate to assure vertical guidance of the extension cabins during their telescoping movement in relation to the main cabin.

Second guide means 8 for guiding extension cabins 3, 4 parallel to longitudinal axis 32 includes two flexible guide elements extending horizontally substantially parallel to the upper and lower walls, and two pairs of pulleys 41, 42 mounted on the lower wall of each extension cabin in the region of open end 29 thereof. Pulleys 41, 42 of each pair are arranged symmetrically with respect to longitudinal axis 32 and each flexible guide element is trained over a respective pair of pulleys in zigzag arrangement, as shown in FIG. 2. The two guide elements are mirror-symmetrical with respect to longitudinal axis 32. In this embodiment, the two flexible guide elements are constituted by a second and separate cable line 34. Cable line 34 has two horizontal, transversely extending end portions anchored to floor 20 of main cabin 2, the anchoring means being pairs of transversely aligned pulleys, cable line end portion 38 being anchored by pulleys 35, 35 while the other horizontal end portion of endless cable line 34 is anchored by pulleys 36, 36, the two flexible guide elements of the endless cable line being trained over pairs of transversely aligned pulleys 41, 42 arranged between pulleys 35 and 36 in the direction of longitudinal axis 32. As shown in FIG. 2, the respective anchoring pulleys for the horizontal end portions of cable lines 17 and 34 are spaced a distance in the direction of longitudinal axis 32 corresponding at least to distance 37 of the telescoping movement of the extension cabins in relation to the main cabin. Tensioning device 39 is arranged in cable line 34 for tensioning the cable and clamping device 40 fixes the cable line to main cabin 2. In this manner, cable line 34 cannot move relative to the main cabin.

This mirror-symmetrical arrangement and fixation of endless cable line 34 in main cabin 2 assures exact parallelism in the guidance of each extension cabin 3, 4 in relation to main cabin 2 along axis 32 so that the extension cabins will always be perfectly centered during their telescoping movement even if cabin construction 1 is not horizontally positioned. This will prevent jamming and maintain the space between the walls of the main and extension cabins constant in all positions of the extension cabins. Thus, gasket 11 will keep the space completely sealed in all positions of the extension cabins.

Using two separate cable lines firmly anchored to the main cabin in the described manner for the two guide means 7 and 8 will be particularly useful for heavily loaded extension cabins since at least one of the cable lines will retain its guiding function even if the other cable line should break. Furthermore, the load will be carried by two separate cable lines. Stretched steel cables with a steel core will be of particular advantage for cable line 34 since it will assure retention of a horizontal position for the extension cabin even after the guide means has been used repeatedly and under heavy loads, such steel cables being only negligeable extensible. The use of a plurality of anchoring pulleys to support the cable lines on the main cabin distributes all forces from the extension cabin to a plurality of points on the main cabin, thus avoiding overloads on any one point. Anchoring cable line 34 of the second guide means to the main cabin avoids any relative movement of the second guide means to the main cabin and this, in turn, keeps the extension cabin properly positioned in relation to the main cabin.

As illustrated in FIG. 2, means 43 may be provided for securing and fixing extension cabin 3, 4 in the retracted position to hold it against telescoping movement, particularly when the cabin construction is moved from site to site. Illustrated fixing means 43 comprises strap 45 connected to one of the cabins. Two hooks 44 are affixed to the strap and a holding member with eyelets is provided on the other cabin for receiving the hooks. Tensioning element 46 is arranged to tension the strap, and the extension cabin is held in its retracted position by engaging the hooks in the eyelets.

FIGS. 7 and 8 schematically illustrate two other embodiments of fixing means 90 and 91 arranged to cooperate with the cable line of the first guide means for glidably carrying and guiding extension cabin 92 for telescoping movement in relation to main cabin 97.

Fixing means 90 shown in FIG. 7 comprises threaded spindle 94 driven by motor 93 which is pivotally mounted on extension cabin 92 and nut 95 threadedly mounted on spindle 94 and held against rotation thereon by a guide rod extending through a bore in the nut so that the nut may move along the guide rod when the threaded spindle is rotated by motor 93 while stoppage of the spindle holds the nut in a fixed position. Each flexible element 98 of the first guide means for extension cabin 92 includes cable line portion 96 between a respective pair of superposed pulleys over which the flexible element is trained in a zigzag arrangement and nut 95 is clamped to tensile element portion 96. When motor 93 is operated, spindle 94 turns in a direction determined by the direction of rotation of the motor output shaft and the rotating spindle will correspondingly move nut 95 up or down. Since the nut is clamped to cable line portion 96, the cable line will be accordingly moved to retract or extend the extension cabin in the direction indicated by arrows 103, depending on the direction of movement of nut 95, stoppage of the spindle rotation fixing extension cabin 92 in position. The length of the displacement path of the extension cabin is delimited by the length of cable line portion 96.

Fixing means 91 illustrated in FIG. 8 comprises respective wedging roller 100 arranged in extension cabin 92 to cooperate with respective upper guide pulley 99 of the pair of superposed pulleys over which each flexible tensile element 98 is trained, the flexible tensile element including portion 96 trained over the superposed pulleys. The wedging roller is operable to engage inclined tensile element portion 96 for clamping the tensile element between pulley 99 and roller 100. As shown, wedging roller 100 is mounted for rotation on a pivotal bracket suspended from the roof of the extension cabin and motor 102 is coupled to the wedging roller for rotating the roller. A spring means consisting of tension spring 101 connected between the pivotal bracket and the end of the extension cabin biases wedging roller 100 against cooperating pulley 99. Friction between wedging roller 100 and cable line portion 96 wedged between the roller and pulley 99 may be increased by providing transverse ribbing on the roller surface. Depending on the direction of rotation of low-voltage motor 102, extension cabin 92 will be extended or retracted in the direction indicated by arrow 103 while it will be held in fixed position when the motor is stopped.

Thus, the fixing means illustrated in FIGS. 7 and 8 also serve as automatic means for operating the cable lines which carry and guide the extension cabin for telescoping movement. Providing fixing means 43 separate from the guide cables has the advantage that the cable lines of the first and second guide means will be fully free of strain when the extension cabins are retracted. This fixing means will prevent any undesired outward movement of the extension cabin, for instance if the cabin construction should be suddenly accelerated during transport from one site to another. Furthermore, the fixing means will also prevent any load being transmitted to the gasket sealing the space between the cabin walls due to such sudden accelerations, the sealing of the space thus being assured even during high-speed movements of the cabin construction. Fixing means 90 and 91 has the advantage of operating without imposing an added load on the main cabin, in addition to be alternatively operable as an automatic retraction and extension means for the extension cabin.

FIGS. 3 and 4 illustrate another embodiment of the first and second guide means for the extension cabin, in which embodiment the first and second guide means are constituted by single cable line 51. The cable line includes portions extending horizontally substantially parallel to the upper and lower walls to constitute the two flexible elements of second guide means 50. The two pairs of pulleys 55, 56 and 61, 62 for the two flexible guide elements are mounted near the open end of extension cabin 47 on the upper wall thereof. Tensioning device 59 is arranged in cable line 51 for tensioning the cable. The respective ends 52 and 66 of single cable line 51 are fixedly anchored to the floor of main cabin 48 near the open end thereof which telescopingly receives extension cabin 47. The portions of the cable line constituting the two flexible tensile elements 67 of first guide means 49 extending in vertical planes substantially parallel to the side walls are trained over pairs of superposed pulleys 53, 54 and 64, 65 mounted on each side wall of extension cabin 47 near the open end thereof, each flexible tensile element being trained over a respective pair of the pulleys in zigzag arrangement. These cable line portions of first guide means 49 are then trained over guide pulleys 55 and 62, respectively, to merge into second guide means 50 where the subsequent cable line portion is trained over a respective pair of pulleys 55, 56 and 61, 62 in zigzag arrangement. The cable line then continues from guide pulleys 56 and 61 portions 68 of flexible tensile elements 67 of guide means 49 are connected by a connecting portion extending transversely to the longitudinal axis and supported by transversely aligned anchoring pulleys 58, 58 mounted in roof 57 of main cabin 48, the roof and floor 69 interconnecting side walls 60 and 70 of the main cabin. While cable tensioning device 59 has been shown arranged in the transversely extending connection portion of cable line 51, it could be mounted in any suitable portion of the cable line. Also, while the cable is preferably a stretched steel cable with a steel core, other types of cables or functionally equivalent flexible tensile members may be used, such as steel bands, chains with short links and the like.

As best shown in the enlarged view of FIG. 4, leading the two guide elements of guide means 50 in two zigzag formations mirror-symmetrical with respect to the longitudinal axis of the cabin construction enables the transverse distance between cable line portions 68 of guide means 49 to be increased so that these cable line portions may be guided close to side walls 60, 70 of main cable 48.

It will be evident from the above description of the first and second guide means incorporated into separate cable lines or a single cable line trained over a series of guide pulleys that the forces operating on the extension cabin will be advantageously transmitted over a plurality of guide and anchoring pulleys. Furthermore, the forces transmitted to the anchoring pulleys in the roof of the main cabin by two extension cabins telescopingly received in opposite open ends of the main cabin will be properly counter-balanced so as to reduce the stress on the main cabin. When the cable tensioning device, as illustrated, is mounted in transversely extending cable line portions, the entire length of the cable line portions extending parallel to the longitudinal axis of the cabin construction is available for the extension and retraction of the extension cabins and the anchoring means for the cable line in the main cabin may be reduced to a minimum.

In the illustrated embodiment of two symmetrically arranged extension cabins received in opposite open ends of a main cabin, with the anchoring pulleys in the roof of the main cabin of the cable line of one extension cabin being mounted between the anchoring pulleys and the lower pulleys of the cable line of the other extension cabin, as hereinabove described in connection with FIG. 2, the main cabin will be subjected only to pressure and not to tensile forces. This makes it possible to apply the guide system of this invention to cabins with relatively weak walls.

As illustrated in FIG. 4, a pair of guide rails 72 is mounted on lower wall 69 of main cabin 48 and lower pulleys 53 and 65 of the pairs of superposed pulleys over which cable line elements 67 are trained have a running face rollingly engaging a respective guide rail. The guide rails are inclined downwardly towards the open end of the main cabin. As shown, the guide rails are of substantially S-shaped cross section, each guide rail 72 having two substantially parallel, horizontal legs, the running face of respective lower pulley 53, 65 rollingly engaging one of the horizontal legs of the guide rail and the other horizontal leg being supported on main cabin call 69. Pulleys 53, 65 have a grooved flange 71 receiving the cable line and flanges 71 engage the guide rails.

This arrangement of flanged guide pulleys 53, 65 cooperating with, and running on, inclined guide rails 72 enables the extension cabin to be guided parallel to the main cabin when, as shown in FIG. 1, the roof of the main cabin is similarly pitched, thus assuring a constant tight seal between the walls of the main and extension cabins by the gasket means to be described more fully hereinafter in connection with certain preferred embodiments thereof. At the same time, the S-shaped cross section of guide rails 72 enables the rails to be used as gutters to remove rain water or other liquids from the cabin structure.

The preferred gasket means illustrated in FIGS. 5 and 6 comprises a pre-stressed sealing element encompassing the extension cabin and having a cross section extending between, and into engaging contact with, the walls of main cabin 48 and extension cabin 47 for supporting an fixing the extension cabin in position relative to the main cabin.

Gasket means 73 shown in the enlarged sectional view of FIG. 5 comprises longitudinally extending support member 79 incorporated into sealing element 74 and arranged to pre-stress the element. The support member is an endless membrane which is fairly stiff in the longitudinal direction but is elastically deformable. The support member may be a strip of metal, for example, such as aluminum, tin-coated iron, spring steel or the like, or of hard rubber reinforced by a web insert. Two pre-stressed elastic rubber sheets 77, 78 extend longitudinally on opposite sides of support member 79 and have their lateral edges vulcanized to the lateral edges of the support member so that the sealing element comprising the support member and the two rubber sheets constitute an integral unit encircling the walls of extension cabin 47 in the space between the extension cabin walls and the walls of main cabin 48. The united rubber sheets constitute an endless rubber tube and the support member divides the tube into two inflatable chambers. Support member 79 has a width exceeding the diameter of the tube in its relaxes condition whereby the support member pre-stresses the elastic rubber tube in a direction transversely to the longitudinal extension of tubber sheets 77 and 78. Elastic rubber sheet 78 has bulging portions extending into engaging contact with the walls of main cabin 48 and rubber sheet 77 has portions extending into engaging contact with the walls of extension cabin 47. Rubber sheet 78 includes web 75 projecting perpendicularly therefrom and strip 76 carried by the web and extending perpendicularly thereto. The strip is received in conforming groove 80 in the walls of main cabin 48 for mounting sealing element 74 on the main cabin. Endless groove 80 in the region of the open end of the main cabin faces the extension cabin and is of T-shaped cross section to receive and hold web 75 and strip 76 of sealing element 74.

In the illustrated embodiment, end piece 81 is mounted on the walls of main cabin 48 at the open end thereof, this end piece constituting a detachable continuation of the walls and having an inwardly projecting lip extending over a part of sealing element 74. The end piece is recessed to form part of groove 80, as shown, and is removably mounted on the main cabin walls by screw bolts 82. In this manner, bolts 82 may be unscrewed to detach end piece 81, thus permitting the sealing element to be removed for maintenance or repair without repairing removal of extension cabin 47.

Rubber sheet 77 has longitudinally extending corrugations 83 for engaging contact with the walls of the extension cabin. When, as shown in full lines, the chambers defined by elastic rubbers sheet 77 and 78 and support member 79 are inflated, sealing element 74 will form a tight seal between the walls of the extension and main cabins. When deflated, as shown in broken lines in FIG. 5, extension cabin 47 may be freely moved in relation to main cabin 48 in the direction of the longitudinal axis of the cabin construction. In this relaxed condition, support member 79 will be elastically deformed since its width exceeds the diameter of the sealing element tube in the relaxed condition. This deformation has been exaggerated in the broken lines for the sake of illustration. When inflated, the rubber sheets forming the sealing element tube will be pre-stressed, which assures that full inflation of the tube will fully seal the space between the cabin walls also in the regions of the rounded corners. The deformability of the sealing element support member, which constitutes the spine of the sealing element, makes it possible to conform the sealing element closely to the inner surfaces of the main cabin walls. The reduction of the inner radius of sealing element 74 during inflation, which could lead to a bend in the element, is compensated by the pre-stress, i.e. a reduction in the stress in the relaxed or rest condition of the sealing element.

The valve inlet (not shown) for inflating sealing element 74 with compressed air is usually arranged at the side from which web 75 projects and may be mounted in a suitable recess in the web. The compressed air conduit leading to the valve inlet may be defined in the walls of main cabin 48. If only one inlet is provided for inflating the sealing element, support member 79 may be perforated to permit the air to pass into both sealing element chambers.

Gasket means sealing element 84 shown in FIG. 6 similarly comprises support member 87 defining two separate inflatable chambers 85, 86 with elastic rubbers sheets 88, 89. The lateral edges of the rubber sheets are vulcanized onto the lateral edges of the support member. In this embodiment, rubber sheets 88, 89 are pre-stressed, i.e. stretched, in the longitudinal direction, i.e. in the direction of the circumference of the cabins, before they are vulcanized onto the support member, thus producing a longitudinal compensation when the sealing element is inflated to obtain tight sealing in rounded corners. Separate compressed air inlet means are provided for each chamber, as shown, so that at least a temporary sealing effect can be obtained by the inflation of one chamber if the other chamber should develop a leak.

The described type of gasket means provides dependable sealing of the space between the cabin walls in all positions of the extension cabin and the pre-stretching of the sealing element walls assures a tight sealing contact with the cabin walls even in rounded corners of small radius. When the sealing element is inflated, it will serve not only to seal the space between the cabin walls but also to hold the extension cabin in position so that potentially damaging vibrations are kept away from the guide means by the damping effect of the sealing element, for instance during the transportation of the cabin construction from one site to another.

While specific and now preferred embodiments of the gasket means have been illustrated and hereinabove described in detail, the gasket means may take any suitable form, such as a simple rubber tube of substantially elliptical cross section, as schematically shown in FIGS. 1 and 2, into which a deformable support element is inserted whose width exceeds the diameter of the tube. Also, instead of mounting the gasket means in an endless groove at the open end of the main cabin, the gasket means may be constituted by two sealing elements mounted on the extension cabin and spaced from each other in the longitudinal direction by a distance corresponding to the length of the extension path. In such an arrangement, the sealing element at the open end of the extension cabin will be operative when the extension cabin is extended while both sealing elements will be operative in the retracted position of the extension cabin.

As an extra safety measure assuring the operation of the gasket means, it may be useful to incorporate in the compressed air conduit system a branch conduit with a safety valve well known in the automobile tire industry so that, when the compressed air source fails for any reason, the sealing element may be inflated or deflated independently.

The above-described and illustrated guidance system for the extension cabin, which assures that the main cabin is subjected only to pressure forces in the region between the anchoring pulleys of the guide means for extension cabins 3 and 4, enables the main cabin to absorb considerable stresses. Main cabins built with walls constituted by laminated synthetic resin sheets are capable of absorbing such high stresses. A very strong wall material is a sheet consisting of an outer skin of aluminum, an inner skin of wood and a core of synthetic resin foam.

While cable line 51 has been shown as having ends 52 and 66 anchored to the main cabin, guide pulleys, such as pulleys 18, may be used to anchor the cable line to the main cabin so that the cable line becomes an endless line, as in the embodiment of FIGS. 1 and 2. In this case, means is provided to prevent the cable line from twisting in relation to the main cabin.

Fixing means 91 of FIG. 8 may be modified if flexible tensile element 98 is a chain by making clamping roller 100 a sprocket. Also, a respective fixing means 90 or 91 may be associated with each flexible tensile element at the respective side walls, motors 93 and 102 being mechanically or electrically controlled to assure a synchronous drive for both tensile elements during the telescoping movement of the extension cabin. Motors 93 and 102 may be pneumatic or hydraulic motors.

What is claimed is:

1. A cabin construction defining an interior chamber of changeable size and comprising
    (a) a main cabin having two side walls and an upper and a lower wall interconnecting the side walls, at least one end of the main cabin being open and the main cabin having a longitudinal axis extending centrally between the side walls,
    (b) an extension cabin having two side walls and an upper and a lower wall interconnecting the side walls, one end of the extension cabin being open and the open end of the extension cabin being telescopingly received in the open end of the main cabin, the respective side, upper and lower walls of the main and extension cabins defining a space therebetween,
    (c) a first guide means for glidably carrying and guiding the extension cabin for telescoping movement in relation to the main cabin in the direction of the longitudinal axis, the first guide means including
        (1) two flexible tensile elements respectively extending in vertical planes substantially parallel to the side walls, and,
        (2) a pair of superposed pulleys mounted in the vicinity of each side wall of the extension cabin near the open end thereof, each flexible tensile element being trained over a respective pair of the pulleys in zigzag arrangement,
    (d) a second guide means for guiding the extension cabin parallel to the longitudinal axis, the second guide means including
        (1) two flexible guide elements extending horizontally substantially parallel to the upper and lower walls, and
        (2) two pairs of pulleys mounted on one of the walls of the extension cabin, the pulleys of each pair being arranged symmetrically with respect to the longitudinal axis, each flexible guide element being trained over a respective pair of the pulleys in zigzag arrangement and the two guide elements being mirror-symmetrical with respect to the longitudinal axis, and
    (e) a gasket means arranged in the space and operable to engage the walls for sealing the space.

2. The cabin construction of claim 1, wherein the two flexible tensile elements of the first guide means are constituted by a first cable line and the two flexible guide elements of the second guide means are constituted by a second and separate cable line.

3. The cabin construction of claim 2, wherein the cable lines are comprised of stretched steel ropes having a steel core.

4. The cabin construction of claim 2 or 3, further comprising a tensioning device arranged in each cable line for tensioning the cable.

5. The cabin construction of claim 2 or 3, further comprising means for anchoring respective end portions of the cable lines to the main cabin, the respective anchoring means being spaced a distance in the direction of the longitudinal axis corresponding at least to the distance of the telescoping movement of the extension cabin in relation to the main cabin.

6. The cabin construction of claim 5, wherein the respective anchoring means are pairs of transversely aligned pulleys over which the end portions of the cable lines are trained.

7. The cabin construction of claim 1, wherein the flexible elements of the first and second guide means are constituted by a single cable line, the cable line including portions extending horizontally substantially parallel to the upper and lower walls to constitute the two flexible guide elements of the second guide means and the two pairs of pulleys for the two flexible guide elements being mounted near the open end of the extension cabin, and further comprising a tensioning device arranged in the cable line for tensioning the cable.

8. The cabin construction of claim 7, wherein the one wall on which the two pairs of pulleys are mounted is the upper wall of the extension cabin.

9. The cabin construction of claim 7 or 8, further comprising a pair of guide rails mounted on the lower wall of the main cabin, a lower one of the superposed pulleys of each pair of superposed pulleys having a running face rollingly engaging a respective one of the guide rails, and the guide rails being inclined downwardly towards the open end of the main cabin.

10. The cabin construction of claim 9, wherein the guide rails are of substantially S-shaped cross section, each guide rail having two substantially parallel, horizontal legs, the running face of a respective lower pulley rolling engaging one of the horizontal legs and the other horizontal leg being supported by the lower main cabin wall.

11. The cabin construction of claim 7, wherein the cable line further includes a connecting portion extending transversely to the longitudinal axis, and the tensioning device is arranged in the transversely extending cable line portion.

12. The cabin construction of claim 1, wherein the extension cabin is arranged for telescoping movement between a retracted and an extended position in relation to the main cabin, and further comprising a means for fixing the extension cabin in the retracted position to hold it against telescoping movement.

13. The cabin construction of claim 12, wherein the fixing means comprises a strap connected to one of the cabins, a tensioning element for tensioning the strap, a hook affixed to the strap, and a holding member on the other cabin for receiving the hook.

14. The cabin construction of claim 12, wherein the fixing means comprises a respective wedging roller arranged in the extension cabin to cooperate with a respective one of the pulleys of each pair of superposed pulleys, each flexible tensile element including an inclined portion trained over the respective pair of the pulleys and the respective wedging roller being operable to engage a respective one of the inclined tensile element portions for clamping the tensile element between the one pulley and the roller.

15. The cabin construction of claim 14, further comprising a motor coupled to each wedging roller for rotating the roller.

16. The cabin construction of claim 14 or 15, further comprising spring means for biasing the wedging roller against the cooperating pulley.

17. The cabin construction of claim 12, wherein the fixing means comprises a motor-driven threaded spindle mounted on the extension cabin and a nut threadedly mounted on the spindle and held against rotation thereon whereby rotation of the spindle moves the nut along the spindle and stoppage of the spindle holds the nut in a fixed position, each flexible tensile element including a portion between the respective pair of the pulleys, and the nut being clamped to the tensile element portion.

18. The cabin construction of claim 1, wherein the gasket means comprises a pre-stressed sealing element encompassing the extension cabin and having a cross section extending between, and into engaging contact with, the walls of the main and extension cabins for supporting and fixing the extension cabin in position relative to the main cabin.

19. The cabin construction of claim 18, wherein the sealing element comprises a longitudinally extending support member incorporated into the sealing element and arranged to pre-stress the element.

20. The cabin construction of claim 19, wherein the sealing element comprises two pre-stressed elastic rubber sheets extending longitudinally on opposite sides of the support member and having their lateral edges vulcanized to the lateral edges of the support member, one of the rubber sheets having portions extending into engaging contact with the walls of the main cabin and the other rubber sheet having portions extending into engaging contact with the walls of the extension cabin, and the one rubber sheet including a web projecting therefrom and a strip carried by the web, the strip being received in a conforming groove in the walls of the main cabin for mounting the sealing element on the main cabin, each rubber sheet defining an inflatable chamber with the support member.

21. The cabin construction of claim 20, wherein the sealing element further comprises a separate compressed air inlet means for each inflatable chamber.

22. The cabin construction of claim 20 or 21, wherein the pre-stressed elastic rubber sheets are pre-stressed in a direction extending transversely to the longitudinal extension of the sheets.

23. The cabin construction of claim 19, wherein the sealing element comprises an endless elastic rubber tube and the support member extends through the endless tube and divides the tube into two inflatable chambers, the support member having a width exceeding the diameter of the tube in its relaxed condition whereby the support element pre-stresses the elastic rubber tube.

24. The cabin construction of claim 1, wherein the walls of the main cabin define an endless groove in the region of the open end, the endless groove facing the extension cabin, and the gasket means being mounted in the endless groove.

25. The cabin construction of claim 24, further comprising an end piece detachably mounted on the walls of the main cabin at the open end thereof and constituting a detachable continuation of the walls, the end piece being recessed to form part of the endless groove.

26. The cabin construction of claim 1, wherein the main cabin has another open end opposite the one open end and a respective extension cabin being telescopingly received in the opposite open ends of the main cabin, the two flexible tensile elements of the first guide means of each extension cabin are constituted by a respective cable line, each cable line including a transversely extending, horizontal portion interconnecting the two flexible elements thereof, and further comprising two anchoring pulleys mounted in the region of the upper wall of the main cabin over which each transversely extending, horizontal cable line portion is trained, another horizontal cable line portion extending from each anchoring pulley to respective upper one of the superposed pulleys, a third cable line portion extending vertically between the respective pairs of superposed pulleys, a fourth cable line portion extending horizontally from a respective lower one of the superposed pulleys, the other cable line portion, the third cable line portion and the fourth cable line portion forming the zigzag arrangement, and the two anchoring pulleys for the transversely extending, horizontal cable line portion of the first guide means of one extension cabin being mounted between the two anchoring pulleys for the transversely extending, horizontal cable line portion and the lower pulleys for the cable line of the first guide means of the other extension cabin, in the direction of the longitudinal axis, the other cable line portions of the first guide means of the extension cabins intersecting between the anchoring pulleys and the upper pulleys.

27. The cabin construction of claim 26, further comprising a cable tensioning device arranged in a respective other cable line portion of the first guide means of each extension cabin.

28. A guide arrangement for the telescoping movement of an extension cabin in relation to a main cabin, each of the cabins having two side walls and an upper and a lower wall interconnecting the side walls, and an open end of the extension cabin being telescopingly received in an open end of the main cabin, the guide arrangement comprising
  (a) a first guide means for glidably carrying and guiding the extension cabin for the telescoping movement, the first guide means including
    (1) a cable line having two portions respectively extending in vertical planes substantially parallel to the side walls, and
    (2) a pair of superposed pulleys mounted in the vicinity of each side wall of the extension cabin near the open end thereof, each cable line portion being trained over a respective pair of the pulleys in zigzag arrangement, and
  (b) a second guide means for guiding the extension cabin parallel to the main cabin, the second guide means including
    (1) a cable line having two portions extending horizontally substantially parallel to the upper and lower walls, and
    (2) two pairs of pulleys mounted on one of the walls of the extension cabin, the pulleys of each pair being arranged symmetrically with respect to a longitudinal axis and each cable line portion being trained over a respective pair of the pulleys in zigzag arrangement, the two cable line portions being mirror-symmetrical with respect to the longitudinal axis.

29. The guide arrangement of claim 28, wherein the respective side, upper and lower walls of the main and extension cabins define a space therebetween, and further comprising a gasket means arranged in the space and operable to engage the walls for sealing the space.

30. A cabin construction defining an interior chamber of changeable size and comprising
  (a) a main cabin having two side walls and an upper and a lower wall interconnecting the side walls, the main cabin having opposite open ends and a longitudinal axis extending centrally between the side walls,
  (b) two like extension cabins each having two side walls and an upper and a lower wall interconnecting the side walls, one end of each extension cabin being open and the open end of each extension cabin being telescopingly received in a respective one of the open ends of the main cabin, and
  (c) a guide means for glidably carrying and guiding each extension cabin for telescoping movement in relation to the main cabin in the direction of the longitudinal axis, each guide means including
    (1) a cable line including two elements respectively extending in vertical planes substantially parallel to the side walls and a transversely extending, horizontal portion interconnecting the two elements,
    (2) two anchoring pulleys mounted in the region of the upper wall of the main cabin over which the transversely extending, horizontal cable line portion is trained, and
    (3) a pair of superposed pulleys mounted in the vicinity of each side wall of a respective extension cabin near the open end thereof, each cable line element consisting of another horizontal cable line portion extending from each anchoring pulley to a respective upper one of the superposed pulleys, a third cable line portion extending vertically between the respective pairs of superposed pulleys and being trained thereover, and a fourth cable line portion extending horizontally from a respective lower one of the superposed pulleys, the other cable line portion, the third cable line portion and the fourth cable line portion of each element forming a zigzag arrangement, and
  (d) the two anchoring pulleys for the transversely extending, horizontal cable line portion of the guide means of one extension cabin being mounted between the two anchoring pulleys for the transversely extending, horizontal cable line portion and the lower pulleys for the cable line of the guide means of the other extension cabin, in the direction of the longitudinal axis, the other cable line portions of the guide means of the extension cabins intersecting between the anchoring pulleys and the upper pulleys.

31. In a cabin construction defining an interior chamber of changeable size and comprising a main cabin having two side walls and an upper and a lower wall interconnecting the side walls, at least one end of the main cabin being open and the main cabin having a longitudinal axis extending centrally between the side walls, and an extension cabin having two side walls and an upper and a lower wall interconnecting the side walls, one end of the extension cabin being open and the open end of the extension cabin being telescopingly received in the open end of the main cabin, the respective side, upper and lower walls of the main cabin and extension cabin defining a space therebetween: a gasket means arranged in the space and operable to engage the walls for sealing the space, the gasket means comprising a pre-stressed sealing element encompassing the extension cabin and having a cross section extending between, and into engaging contact with, the walls of the main and extension cabins for supporting and fixing the extension cabin in position relative to the main cabin, the sealing element including a longitudinally extending, substantially stiff but elastically deformable support member and two elastic rubber sheets extending longitudinally on opposite sides of the support member and having their lateral edges vulcanized to the lateral edges of the support member, the support member constituting a spine of the sealing element arranged to pre-stress the elastic rubber sheets thereof, one of the rubber sheets having portions extending into engaging contact with the walls of the main cabin and the other rubber sheet having portions extending into engaging contact with the walls of the extension cabin, and the one rubber sheet including a web projecting therefrom and a strip carried by the web, the strip being received in a conforming groove in the walls of the main cabin for mounting the sealing element on the main cabin, each rubber sheet defining an inflatable chamber with the support member.

32. In the cabin construction of claim 31, the sealing element further comprising a separate compressed air inlet means for each inflatable chamber.

33. In the cabin construction of claim 31 or 32, an end piece detachably mounted on the walls of the main cabin at the open end thereof and constituting a detachable continuation of the walls, the end piece being recessed to form part of the groove.

* * * * *